(12) United States Patent
Powell

(10) Patent No.: US 6,243,928 B1
(45) Date of Patent: Jun. 12, 2001

(54) CABLE AND PIPE CLIP

(75) Inventor: David Powell, Basingstoke (GB)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/387,862

(22) Filed: Sep. 1, 1999

(30) Foreign Application Priority Data

Sep. 10, 1998 (GB) .................................................. 9819763

(51) Int. Cl.$^7$ ............................. A44B 17/00; F16B 19/00; F16L 3/08
(52) U.S. Cl. ................................ 24/458; 24/297; 24/453; 411/508
(58) Field of Search ........................... 24/458, 297, 453; 411/508

(56) References Cited

U.S. PATENT DOCUMENTS

| | | | |
|---|---|---|---|
| 1,294,522 | * 2/1919 | Nathan | 24/458 |
| 3,249,973 | * 5/1966 | Seckerson | 24/297 |
| 3,445,979 | * 5/1969 | Meyer | 24/297 |
| 3,871,088 | 3/1975 | Leitner . | |
| 4,470,737 | * 9/1984 | Wollar | 411/508 |
| 4,505,006 | 3/1985 | Andre . | |
| 4,622,725 | * 11/1986 | Bumgardner | 24/297 |
| 4,738,424 | 4/1988 | Conner . | |
| 4,932,105 | * 6/1990 | Muller | 24/297 |
| 4,943,183 | * 7/1990 | Nakano | 24/297 |
| 5,228,816 | * 7/1993 | Boville | 24/297 |

FOREIGN PATENT DOCUMENTS

| | | | |
|---|---|---|---|
| 444 504 | 11/1934 | (GB) . | |
| 1 131 835 | 10/1966 | (GB) . | |
| 1 277 071 | 5/1969 | (GB) . | |
| 1341695 | * 12/1973 | (GB) | 24/297 |
| 1 478 166 | 12/1974 | (GB) . | |
| 1 491 073 | 1/1975 | (GB) . | |
| 2 001 726 | 2/1979 | (GB) . | |

* cited by examiner

Primary Examiner—Victor N. Sakran
(74) Attorney, Agent, or Firm—Roger C. Turner

(57) ABSTRACT

A clip (10) is provided for securing an object such as a cable to a body (32) such as a wall of a supporting frame, which is of simple and rugged design and that allows one-hand operation. The clip includes first and second jaws (18, 20) with lower ends (60, 62) that are pivotally connected, upper ends (70, 72) that can grasp the object between them when the jaws are pivoted together, and middle parts (94). The body has a slot (22) that receives the middle parts of the jaws to hold the jaws together so the upper parts grasp the object.

7 Claims, 4 Drawing Sheets

CABLE AND PIPE CLIP

BACKGROUND OF THE INVENTION

When a new peripheral device is added to a computer, a part of an engine is replaced, or a new piece of equipment is installed, the number of free cables, pipes, and the like also increases. Securing devices are used to hold cables to walls to avoid a tangled mess of cables, and to hold hoses in an engine to avoid them contacting a hot damaging surface or the like.

One type of holding device is an elongated plastic strip which can be looped around the object to be held, with the strip having teeth at one end and a locking mechanism at the other end that can move the teeth to tighten the loop. The strip can be passed through slits in the equipment wall to fix its position. Operation of the locking mechanism requires two hands, and it is easy to overtighten the strip and crush the cable or pipe that it holds. To remove a cable or pipe, the strip must be cut, so a replacement must be used. A clip that can hold a cable, pipe, or other object to a body wall, in a manner that enables easy one-hand operation, that avoids crushing the cable or pipe and that enables reuse, would be of value.

SUMMARY OF THE INVENTION

In accordance with one embodiment of the present invention, a clip and a body are provided for fixing the position of an object gripped by the clip, that enables easy clip operation. The clip has a pair of jaws with upper ends that can be moved together and apart to grasp and release the object, lower ends that are pivotally connected, and middles. With the upper ends of the jaws moved against the object, the clip is inserted into a narrow portion of a slot so the middles of the jaws are pressed together to thereby press the upper ends of the jaws tightly against the object.

The body can include a slot with wide and narrow parts, so the clip can be initially inserted into the wide part and then slid along the slot into the narrow part to hold the object in place. The jaws are preferably integrally molded with a web at their lower ends that couples them in a hinge joint to pivotally connect them. The lower ends have upstanding foots that can deflect during insertion down into the slot, and which then press up against the body.

The novel features of the invention are set forth with particularity in the appended claims. The invention will be best understood from the following description when read in conjunction with the accompanying drawings.

DESCRIPTION OF THE PREFERRED EMBODIMENTS

Figure 3:
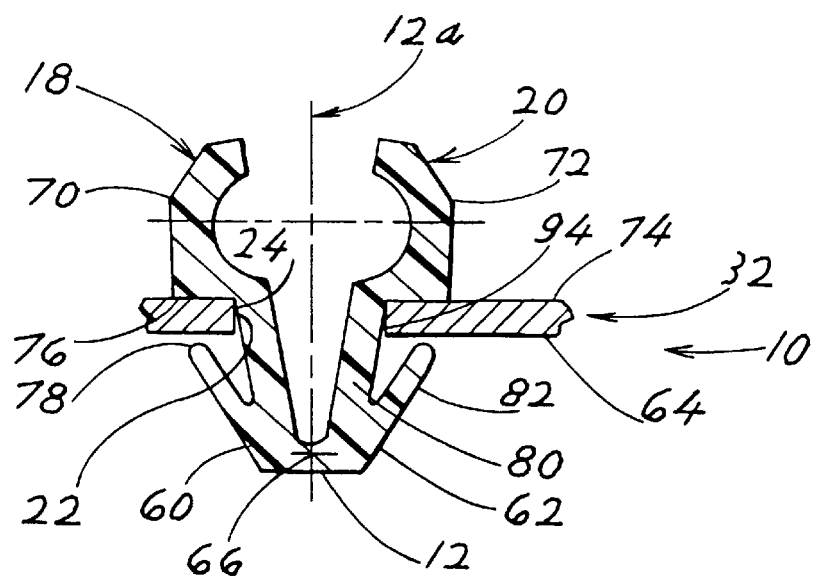
FIG. 3 is a sectional view of the clip and body, showing a section of the clip lying in a wide part of the body slot.

FIG. 3 illustrates a clip 10 of the present invention, lying in a slot 22 of a plate-like body 32. The clip has first and second jaws 18, 20 with lower ends 60, 62 that lie below a lower surface 64 of the body 32 and that are joined at a pivot axis 66. The jaws have upper ends 70, 72 that lie above an upper surface 74 of the body and that can move together and apart when the jaws pivot. The clip is symmetric about a vertical plane 12a that passes through the axis. The upper ends of the jaws have downwardly facing surfaces 76 that abut the upper surface 74 of the body, while the lower ends of the jaws have lower surfaces 78 that abut the lower surface of the body. This prevents the clip from unintentionally coming out of the slot 22, and avoids rattling of the clip in the slot. The lower ends 60, 62 include main parts 80 and upwardly-projecting foots 82 that form the surfaces 78 to engage the lower surface of the body. The foots 82 can bend slightly during downward insertion of the clip into the slot, and press against the lower surfaces of bodies of slightly different thicknesses.

Figure 1:
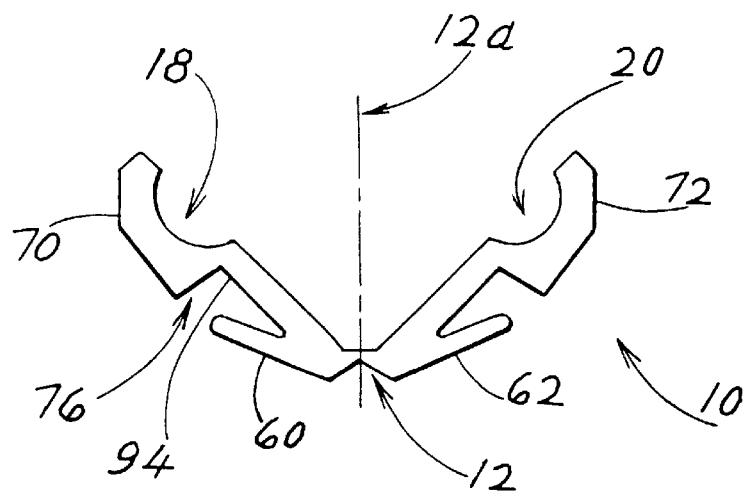
FIG. 1 is an end elevation view of a clip of the present invention, shown in a fully open position.
Figure 2:
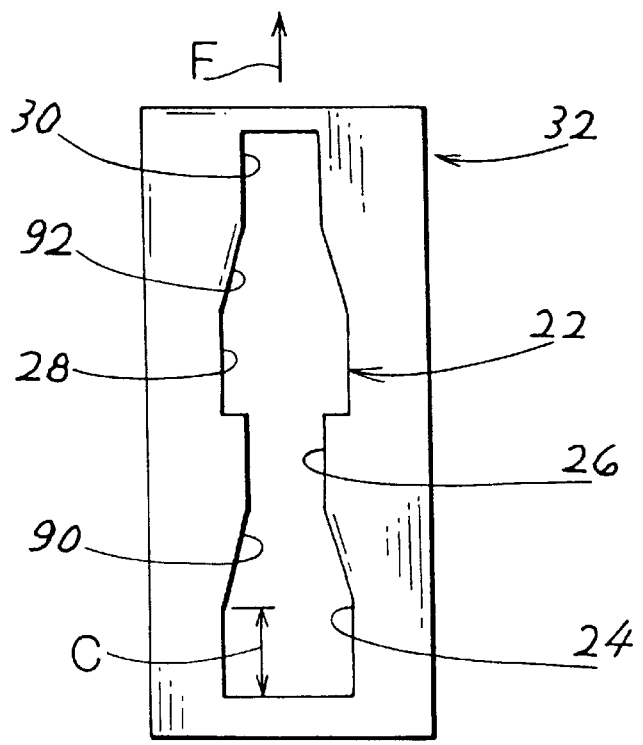
FIG. 2 is a plan view of a body in which the clip of FIG. 1 can be inserted.
Figure 4:
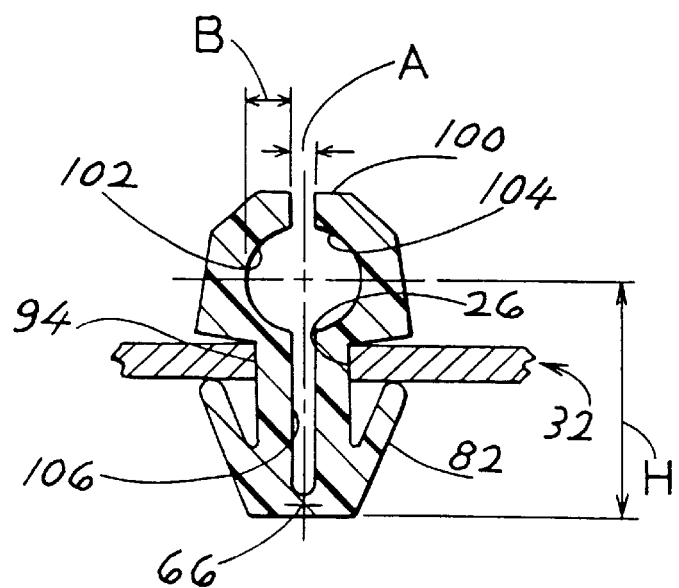
FIG. 4 is a view similar to that of FIG. 3, but with the clip part having been slid into a narrow part of the body slot.
Figure 5:
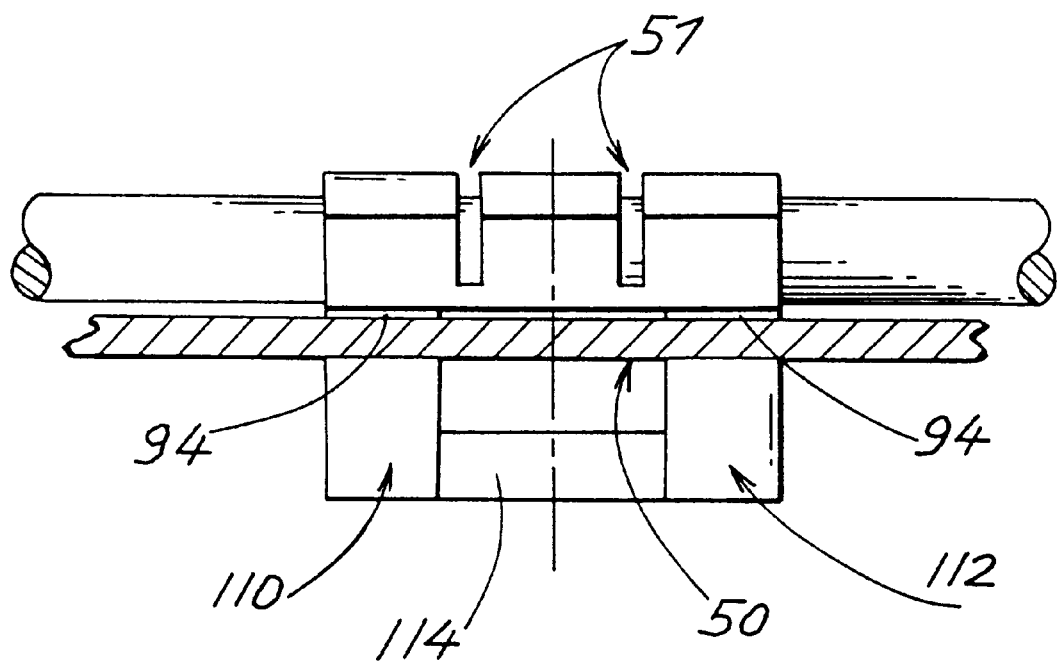
FIG. 5 is a side elevation view of the clip and body of FIG. 4.
Figure 7:
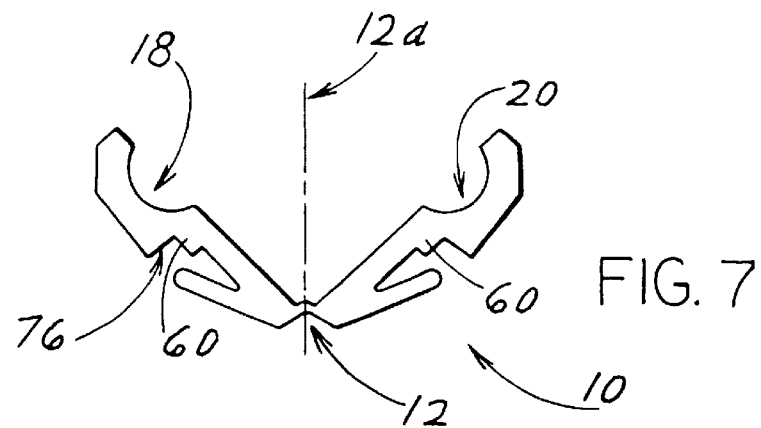
FIG. 7 is an end elevation view of a clip constructed in accordance with another embodiment of the invention.

As shown in FIG. 2, the slot 22 has wide parts 24, 28 and narrow parts 26, 30. A tapered slot part 90, 92 connects each wide part to a corresponding narrow part. The clip section shown in FIG. 3 lies in a slot wide part 24, but can be slid to a narrow part. FIG. 4 shows the clip after it has been slid into the narrow part 26. During such sliding, middle parts 94 of the jaws are pushed together by the narrowing slot walls, to the configuration shown in FIG. 4. In FIG. 4, the foots 82 are still widely spaced, to provide stable positioning of the closed clip on the body. The jaws have tops 100 that lie above gripping surfaces in the form of jaw recesses that each receive part of the object to be hold. The tops 100 of the jaws preferably do not move together, but are separated by a distance A which is at least 10% of the width B of each jaw recess. Also, the middle and lower parts of the jaws have inner surfaces 106 that are parallel and spaced apart. Thus, pressing of the middle parts 94 of the jaws does not cause the jaws to press against each other, but causes each jaw to press against the object to securely grip it.

Figure 6:
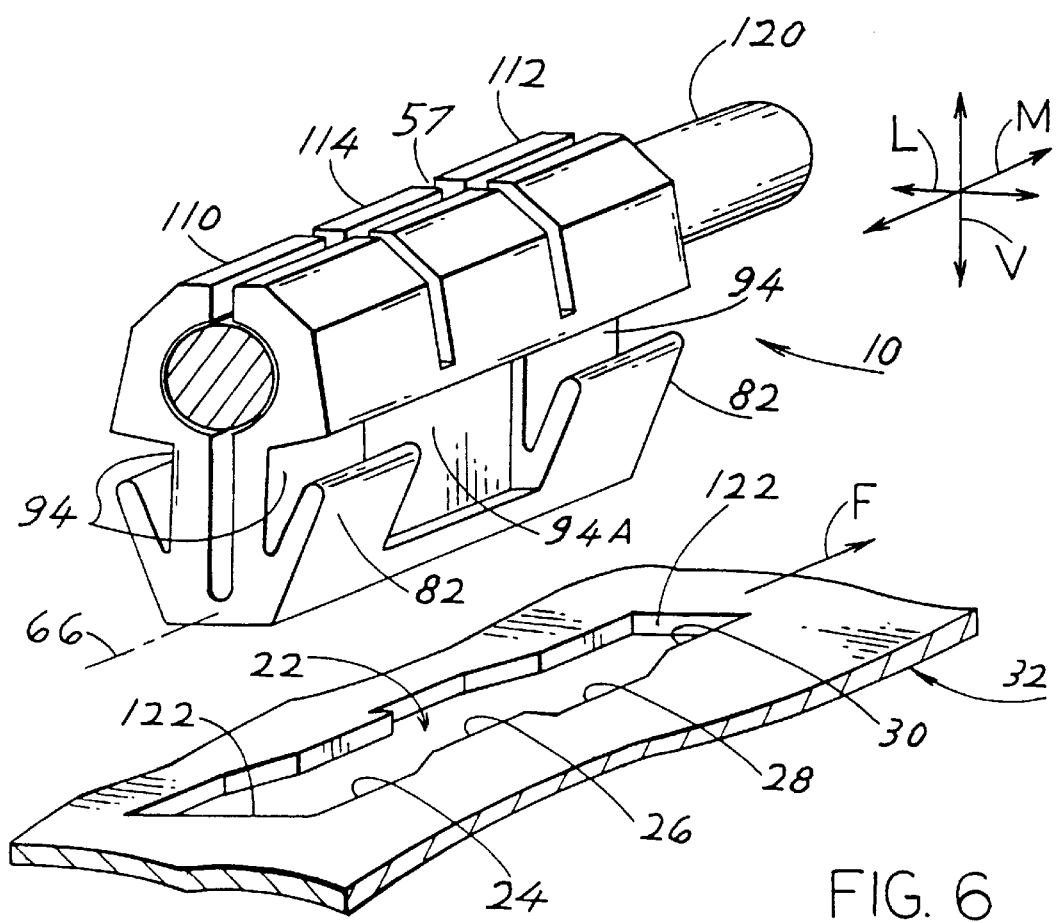
FIG. 6 is an exploded isometric view of the clip and body of FIG. 4.

The clip 10 is preferably formed by a single integrally molded part that forms the two jaws and a web 12 that connects the lower ends of the jaw to forms a hinge that allows pivoting about the axis 66. The clip can be constructed with a relatively short length that is about equal to the length C shown in FIG. 2 of a wide part 24, a tapered part 90, and narrow part 26. It is possible to increase the length of the slot part C and to correspondingly increase the length of the clip. However, this results in a slot having a length 3C that is three times as long as the clip. Applicant can use the slot 22 of FIG. 2 which has two wide parts 24, 28, two narrow parts 27, 30, and two tapered parts 90, 92 to use a clip having a length more than half the total length of the slot. FIG. 6 shows the construction of the clip that allows the use of a long clip in an only slightly longer slot.

As shown in FIG. 6, the clip has two end sections 110, 112 and a center section 114. Slots 57 separate upper ends of the sections. The sections are spaced in a longitudinal direction M which is parallel to the pivot axis 66 of the clip. The center section 114 is different from the end sections because its middle part 94A is thinner than the middle parts of the end sections 110, 112. It is also possible to have the middle part completely cut away at 94A. This construction allows the middle part 94A to project down into, and to lie in the narrow part 26 of the slot while the end sections of the jaws are pivoted apart in the configuration of FIG. 3. This allows the entire clip to be moved down into the slot 22, by the end sections 110, 112 being inserted down into the wide parts 24, 28 while the center section 114 is inserted down through the narrow part 26. The foots 82 deflect together during insertion. Then, the entire clip is slid in the direction of arrow F so the middle parts 94 of the end sections are pushed together to clamp the object 120.

Instead of providing a slot with closed opposite ends 122, 124, it is possible to provide a slot that extends to the extreme edge of the body 32, so the clip can be slid into the slot and immediately clamps the object. The slot can be oriented vertically with respect to the Earth, with the narrow ends such as 26, 30 of the slot lying below the wider ends, to help avoid the clip moving back toward the wider ends as a result of vibrations. It is also possible to provide teeth in the middle part 94 and corresponding teeth in the narrow parts of the slot to avoid such movement. Pressure of the top surfaces 78 of the foots against the body provide friction to resist clip sliding.

While terms such as "upper," and "lower," have been used to describe the clip and combination of clip and body as illustrated, it should be understood that it is possible to use the clip and body in any orientation with respect to the Earth.

Thus, the invention provides a clip and a combination of a clip and body, which enables the clip to secure an object such as a cable or pipe to the body. The body has a slot, while the clip has a pair of jaws with upper ends that can grip the object and lower ends that are pivotally connected. The upper ends can be pressed together by the fingers of one hand to grip an object between them, and a middle part of the jaws can be slid down into or longitudinally along the slot in the body so the side walls of the body slot press the middle parts of the jaws together and hold them together. The clip is preferably molded as a single piece, with a web that connects the lower ends of the two jaws and that is molded integrally with the jaws. The slot in the body preferably has a wide part through which the clip can be inserted and a narrower part into which the clip can be slid to hold the jaws together. The lower ends of the jaws have primarily upwardly-projecting foots that can deflect together during insertion of the clip into the wide slot part, and which press against the lower surface of the body when the clip lies in the narrow part of the slot. A long clip can be installed into a slot of only slightly greater length than the clip, by providing the clip with opposite end sections and with a special center section. In that case, the center section has an indented middle part or is devoid of a middle part, and the body has with a slot with two wide sections that can receive the end sections of the clip, and two narrow sections.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A combination of a clip for holding an elongated object such as a cable, and a body for holding the clip, wherein:

said body has upper and lower surfaces and forms a slot extending between said surfaces, with said slot having opposite slot walls;

said clip has a pair of jaws with upper and lower ends with said upper ends being moveable together and apart, with each jaw upper end having an object-engaging surface facing the other jaw to hold the object between the two object-engaging surfaces when the jaw upper ends are moved together, with each jaw lower end pivotally connected to the other jaw lower end to allow said jaw upper ends to move together and apart, with each jaw upper end having a downwardly-facing surface for engaging the body upper surface, with each jaw lower end having an upwardly-facing surface for engaging the body lower surface, and with each jaw having a middle part for engaging said walls of said slot;

said slot has a wide part through which said jaw lower ends can pass until said jaw middle parts lie in said slot wide apart, and said slot has a narrow part of smaller width than said wide part to push said middle parts closer together as said clip is slid along said slot into said narrow part with said slots having tapered parts between said wide and narrow parts to thereby push said jaw upper ends closer together.

2. The combination described in claim 1 wherein:

said slot has a tapered part of tapered width that connects said slot wide part and said slot narrow part.

3. A method securing an elongated object such as a cable, to a body, comprising:

sliding into a narrow part of a slot of said body, a clip that has a pair of jaws with jaw lower ends that are pivotally connected, jaw upper ends with walls that form recesses to grip the object, and jaw middles lying between said upper and lower ends, so said jaw middles move into said narrow part of said slot to push said jaw middles closer together;

placing a length of said elongated object between said jaw upper ends prior to moving said jaw middles into said narrow part of said slot.

4. A clip for securing an object such as a cable, to a body that has upper and lower body surfaces and that has a clip-receiving slot extending between said surfaces, comprising:

first and second jaws that have upper ends that can be moved together and apart, with each jaw upper end having a gripping surface facing the other jaw to hold the object between the gripping surfaces when the jaw upper ends are moved together, with each jaw having a lower end pivotally connected to the other jaw to move said upper ends together and apart, and with each jaw having a jaw middle for lying in the slot so the slot can press the jaw middles together;

each of said jaw upper ends has a downwardly-facing surface for lying adjacent to the body upper surface and each of said jaw lower ends has an upwardly-facing surface for lying adjacent to the body lower surface, with each jaw lower end including a main lower part and an elongated foot extending primarily upwardly from one of said main lower parts and having a foot upper end forming one of said upwardly-facing surfaces, with each foot being largely horizontally deflectable.

5. A clip for securing an object such as a cable, to a body that has upper and lower body surfaces and that has a clip-receiving slot extending between said surfaces, comprising:

first and second jaws that have upper ends that can be moved together and apart, with each jaw upper end having a gripping surface facing the other jaw to hold the object between the gripping surfaces when the jaw upper ends are moved together, with each jaw having a lower end pivotally connected to the other jaw to move said upper ends together and apart, and with each jaw having a jaw middle for lying in the slot so the slot can press the jaw middles together;

said clip-receiving slot has opposite sides and the middle of each jaw engages one of said slot sides;

said slot has a wide part through which said jaw lower ends can pass in a direction normal to said body upper surface, and said slot has a narrow part of smaller width than said wide part to push said middle parts closer together;

said jaw gripping surfaces are spaced apart along a predetermined lateral direction, said jaw upper and lower ends are spaced along a vertical longitudinal direction that is perpendicular to both said later and vertical directions;

said clip has front and rear sections spaced along said axis and a center section lying between said front and rear sections;

said middle parts of said jaws are cut-away at said center section to allow said center section to be pressed down into said narrow portion of said slot.

6. A combination of a clip for holding an elongated object such as a cable, and a body for holding the clip, wherein:

said body has upper and lower surfaces and forms a slot extending between said surfaces, with said slot having opposite slot walls;

said clip has upper and lower ends and said clip has a pair of jaws with upper ends that can be moved together and apart, with each jaw upper end having an object-engaging surface facing the other jaw to hold the object between the two object-engaging surfaces when the jaw upper ends are moved together, with each jaw having a lower end pivotally connected to the other jaw to move said upper ends together and apart, with each jaw upper end having a downwardly-facing surface for engaging the body upper surface, with each jaw lower end having an upwardly-facing surface for engaging the body lower surface, and with each jaw having a middle part for engaging said walls of said slot;

said slot in said body having a portion that is narrow enough to press said jaw middle parts together to press said jaw upper ends toward each other to hold said object;

said jaw lower ends have largely upwardly-projecting foots which can be resiliently deflected toward each other and which form said upwardly-facing surfaces.

7. A combination of a clip for holding an elongated object such as a cable, and a body for holding the clip, wherein:

said body has upper and lower surfaces and forms a slot extending between said surfaces, with said slot having opposite slot walls;

said clip has upper and lower ends and said clip has a pair of jaws with upper ends that can be moved together and apart, with each jaw upper end having an object-engaging surface facing the other jaw to hold the object between the two object-engaging surfaces when the jaw upper ends are moved together, with each jaw having a lower end pivotally connected to the other jaw to move said upper ends together and apart, with each jaw upper end having a downwardly-facing surface for engaging the body upper surface, with each jaw lower end having an upwardly-facing surface for engaging the body lower surface, and with each jaw having a middle part for engaging said walls of said slot;

said slot in said body having a portion that is narrow enough to press said jaw middle parts together to press said jaw upper ends toward each other to hold said object;

said object-engaging surfaces of said jaws are spaced apart along a predetermined lateral direction, said jaw upper and lower ends are spaced along a vertical direction, and said jaw lower ends are pivotally connected in pivoting about a longitudinal direction that is perpendicular to both said lateral and vertical directions;

said clip has front and rear sections spaced along said axis and a center section lying between said front and rear sections;

said slot has a pair of longitudinally-spaced wide parts and a pair of longitudinally spaced narrow parts, with one of said narrow parts lying longitudinally between two of said wide parts;

said middle parts of said jaws are cut-away at said center section to allow said center section to be moved vertically down into one of said narrow parts of said slot in said body while said front and rear sections are moved down into said wide parts of said slot.

\* \* \* \* \*